United States Patent [19]
de Boois et al.

[11] Patent Number: 6,069,465
[45] Date of Patent: May 30, 2000

[54] GROUP CONTROL SYSTEM FOR LIGHT REGULATING DEVICES

[75] Inventors: Karl de Boois, Amsterdam; Nicolaas Simon Nootebos, Assendelft, both of Netherlands

[73] Assignee: Hunter Douglas International N.V., Netherlands Antilles

[21] Appl. No.: 09/183,467

[22] Filed: Oct. 30, 1998

[30] Foreign Application Priority Data

Oct. 31, 1997 [EP] European Pat. Off. .............. 97203400
May 27, 1998 [EP] European Pat. Off. .............. 98201763

[51] Int. Cl.[7] ...................................................... E06B 9/24
[52] U.S. Cl. ................................ 318/675; 318/41; 318/53
[58] Field of Search ................................ 318/675, 41, 49, 318/53, 101, 102, 103, 484

[56] References Cited

U.S. PATENT DOCUMENTS

| | | | |
|---|---|---|---|
| 4,174,494 | 11/1979 | Pfeffer | 318/54 |
| 4,492,908 | 1/1985 | Stockle et al. | 318/663 |
| 4,856,574 | 8/1989 | Minami et al. | 160/168.1 |
| 5,038,087 | 8/1991 | Archer et al. | 318/469 |
| 5,463,296 | 10/1995 | Fugere et al. | 318/568.2 |
| 5,532,560 | 7/1996 | Element et al. | 318/266 |

FOREIGN PATENT DOCUMENTS

| | | |
|---|---|---|
| 507365 | 10/1992 | European Pat. Off. . |
| 381643 | 4/1993 | European Pat. Off. . |
| 354175 | 6/1993 | European Pat. Off. . |
| 273719 | 7/1995 | European Pat. Off. . |
| 687794 | 12/1995 | European Pat. Off. . |
| 2692418 | 12/1993 | France . |
| 2001577 | 7/1972 | Germany . |
| 2917832 | 11/1980 | Germany . |
| 9300366 | 3/1994 | Germany . |
| 19615554 | 10/1997 | Germany . |
| 10-159466 | 6/1998 | Japan . |

Primary Examiner—Bentsu Ro
Attorney, Agent, or Firm—Dorsey & Whitney LLP

[57] ABSTRACT

The invention relates to a control system (1) for light regulating devices such as blinds or shades. The control system comprises a control unit (6, 6') for connecting to a motor drive (7) of a light regulating device. The control unit comprises a first input (18) for receiving motor control data along a data supply line (9, 9"). A second input (17, 26, 26') is provided for receiving decentralized user commands for altering the position of the light regulating device. The control system is characterized in that the control unit (6, 6'), by means of an external command input (25') can be set into either a slave mode in which data can only be received or into a master mode in which data can be received and transmitted along the data supply line (9, 9'). Hereby any light regulating device can be selected as a master device for controlling the blinds in the same group. Preferably the command input of the control unit comprises a manually operatable switch such as a dip switch.

31 Claims, 3 Drawing Sheets

GROUP CONTROL SYSTEM FOR LIGHT REGULATING DEVICES

FIELD OF THE INVENTION

The present invention generally relates to light regulating devices such as blinds or shades. More particularly, the present invention relates to a system for controlling the position and/or orientation of light regulating devices.

BACKGROUND OF THE INVENTION

The position of a light regulating device is often altered via a motor drive unit which receives control signals from a control unit. Often the control units for multiple light regulating devices are interconnected such that the activation of a control unit for one light regulating device results in the activation of a control unit for a plurality of light regulating devices. As a result, the position of all the interconnected light regulating devices are controlled the same. One such approach is disclosed in European Patent Number EP-A-0,507,365, issued to the applicant (hereafter, the "'365 Patent").

The '365 Patent discloses a system for operating a set of blinds in which the sets of motorized blinds are each associated with a control unit. The known control system comprises a control unit with an output connectable to a motor drive of a light regulating device, and comprises a first input connectable to a data supply line for receiving motor control data for operating the motor drive of the light regulating device and a second input for receiving decentralized user commands for altering the position of the light regulating device. In this arrangement several control units are interconnected by means of power lines and control lines. Operating units, such as a switch or a remote control infrared transmitter, for opening or closing the blinds or for adjusting the angular position of the slats are to be connected to each of the control units. One of the operating units is connected to both the power input and to one of the control units and can operate a single motorized blind associated with that one control unit or operate a group of such blinds via mutual connections between the different control units. As a result, the operation of the operating unit common to a group of control units causes the blinds associated with the other control units to be actuated. If a different arrangement is desired the wiring connections need to be rearranged and additional operating units may have to be installed. Thus, a system is needed which allows a control unit associated with a specific blind to be configured to operate in conjunction with a plurality of control units or to be operated independent of other control units.

SUMMARY OF THE INVENTION

It is an object of the present invention to provide a system for controlling sets of motorized blinds, in which a large degree of freedom of actuation of either individual blinds or different groups of blinds can be achieved. It is further a particular object of the present invention to provide a blind control system which is easy to install and by means of which groups of blinds can be easily defined for group control in an existing wiring layout. It is a further object of the present invention to provide a blind control system in which the position of all blinds in a group can be accurately determined and coordinated in a synchronized way. It is again an object of the present invention to provide a blind control system wherein in case of a defect of one of the blinds, or of the control unit associated therewith, the other blinds in the group can still be operated.

Hereto the control system according to the present invention is characterized in that the control unit can by means of a command input be set into either a slave mode in which data can only be received or into a master mode in which data can be received and transmitted along the data supply line.

By providing each control unit with a command input to be set into either a slave mode or a master mode, any control unit can be selected as a master device for controlling the blinds in the same group. Preferably the control unit comprises an address input in which by means of a command the address of the control unit can be set by a user. Hereby it is possible to easily define groups of blinds which can be actuated together to assume the same position. In a preferred embodiment the address input comprises at least one switch, which can be a manually operated switch such as a dip switch. The dip switches can be integrated on the printed circuit board of the control unit.

Different sets of blinds, each blind having its own control unit, can be interconnected via the data supply line to a group control unit. The group control unit can comprise a manually operatable input, such as a dial, for forming a command signal for each control unit associated with the group control unit. The associated control units may thereby be activated regardless of address. In addition, the group control unit can have an input for receiving an electrical signal as the user command signal for adjusting the positions (angular position, up or down position or horizontal position) of the blinds in the group. Again, each group control unit may be connected via the data supply line to a main control unit, the actuation of which determines the position of all groups of blinds. The power supply and data communication may be comprised of one set of lines, preferably a two wire electrical conductor, fulfilling both functions, preferably semisimultaneously, via multiplexers.

Preferably each control unit comprises a pulse input for receiving either time pulses or motor pulses generated by rotation of the motor drive. The control unit determines for each light regulating device the number of pulses that are generated when moving the light regulating device between its fully open and fully closed positions. In this way a correspondence between the pulse count and the blind positions is obtained. Alternatively if motor pulses are unsuitable for detection or difficult to detect due to the specific construction of the electric motor, there is preferably an option to switch to the use of time pulses. When time pulses are selected the control unit determines the number of time pulses elapsed during operation of each motor drive for movement between predefined positions. Thereby a correspondence between the number of time pulses and the respective blind positions is obtained. Preferably the control unit can after installation of the blinds in a building, execute a calibration routine in which the drive motors of all blinds in a group are placed in a predetermined reference position. Subsequently the blinds can be adjusted to correspond to the preset motordrive reference positions. This may for instance occur by manually actuating the slate of the blinds by for instance a potentiometer but also by executing a preprogrammed algorithm.

In an other embodiment of the present invention the motor drives are deactivated by the control unit after receiving a predetermined number of motor or time pulses. This may indicate that the blinds have reached their desired positions or that the blinds have reached their fully opened, fully closed, or fully tilted end positions.

Due to inaccuracies during read out of the pulses it is preferred to regularly adjust the pulse count with respect to the actual position of the blinds. Hereto, after a predetermined number of operations of the motor drive associated with the control unit, the control unit moves the motor drive to the fully opened or fully closed position and the corresponding motor or time pulse count in the control unit is checked for correspondence with said position. When necessary, a correction of the pulse count in the control unit can be made.

BRIEF DESCRIPTION OF THE DRAWING FIGURES

An embodiment of the control system will be explained in detail with reference to the accompanying drawings. In the drawings:

FIG. 1 shows a schematic diagram of a control system according to the present invention, FIG. 2 shows a schematic diagram of a control unit according to the present invention, and FIG. 3 shows a schematic flow chart of the operation of a control unit according to the present invention.

DETAILED DESCRIPTION OF A PREFERRED EMBODIMENT OF THE INVENTION

Figure 1:
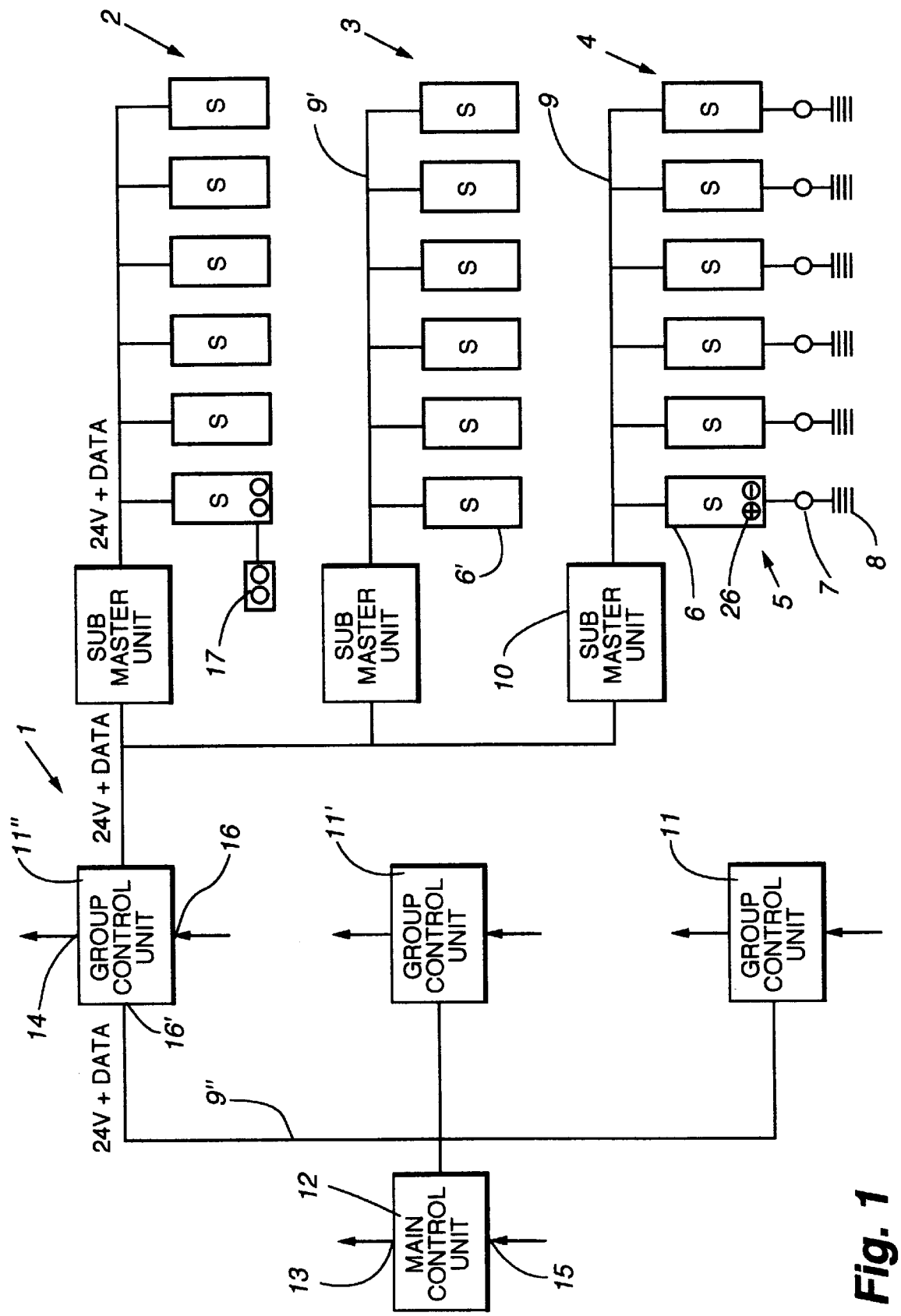

FIG. 1 shows a control system 1 comprising sets 2, 3, 4 of motorized light regulating assemblies 5, for instance up to a total of 50 assemblies in each set. Each light regulating assembly 5 comprises a control unit 6, the output of which is connected to a motor drive 7 of a blind 8. The blind 8 may comprise a venetian or horizontal blind, a vertical slat blind, a shade or any other light regulating device known in the art. Each set of light regulating assemblies 5 is connected to a data and power transmission line 9,9' and via a sub master unit 10 to a group control unit 11, the sets 2, 3 and 4 forming one group. The sub master unit 10 preferably is identical to the control unit 6 but set to operate in a master mode rather than in the slave mode of control unit 6. Different group control units 11, 11', 11" are connected to a main control unit 12 via the data and power transmission line 9". The main control unit 12 again preferably is identical to the group control units 11, 11', 11" and it is the position of these units within the circuit which determines whether it functions as a group control unit 11 or as a main control unit 12. The group control units 11–11" and the main control unit 12 are connected to a 24 V DC supply via a respective terminal 13, 14. A 1–10 V data input 15, 16 is provided for the main control unit 12 and for each group control unit 11–11" for attaching to a building management system, such as an Echelon bus or an EIB-bus for building control or directly to a suitable programmable logic control (PLC) such as a personal computer. The external device, such as a PLC or bus system applies a specific voltage between 1 and 10 V over the 1–10 V signal input. The particular voltage level corresponds for instance to a predefined slat position of the light regulating devices downstream of the group control unit.

The combined data and power transmission lines 9, 9', 9" comprise a two-wire bidirectional 300 baud half-duplex line supplying the 24 V DC supply voltage to the control units 6, 6' and transmitting datapulses to the control units. Each group control unit 11–11" and the main control unit 12 comprises a dial for selecting 32 blind positions. The selected blind position will be transmitted to each control unit 6, 6' and to other group control units connected to the combined 24 V supply and data communication output terminal of the operated Group control unit, 3 seconds after the last operation of the dial. When a new position is indicated within 3 seconds no position change will be communicated to the other connected control units. At the 1–10 V data signal inputs 15, 16 of the group control units 11–11" or of the main control unit 12, again 32 blind positions can be received. The selected blind position is transmitted 3 seconds after the last input voltage change to all connected control units 6, 6' and to other connected group control units which are connected to the 24 V DC supply and data communication output. If within 3 seconds an other voltage is presented at the inputs 15, 16 no position change will be transmitted to the control unit 6, 6'. During a position change at the 1–10 V data signal inputs 15, 16 and 10 seconds after a last voltage change at said input, positional variations of the manual adjustment dial on the group control units 11–11" or on the main control unit 12 will be ignored. All valid communication commands which are received at the 24 V DC supply and data communication input 16' of group control units 11–11" are directly transmitted to the 24 V DC supply and data communication output thereof such that a number of group control units can be placed in series. In a reverse direction no communication commands are transmitted from the 24 V DC supply and data communication output to the 24 V DC supply and data communication input of group control units 11–11'.

Each control unit 6, 6' or 10 respectively comprises a dip switch (generally 25') for placing the control unit in a master mode, in which mode data can be received from and transmitted to the power and data transmission line 9, 9'. In the master mode of the control unit 6 (respectively 10), the blind 8 is actuated by a user by operating an externally positioned auxiliary up and down switch unit 17 connected to the control unit 6, data pulses will be generated by the control unit 6 on the power and data transmission line 9 which pulses will be transmitted to all control units within the same set 4, but only those control units which have the same address as the control unit 6 of the master blind 8 will respond to the data pulses.

When the dip switch of the control unit 6 is set in the slave mode, data can only be received by the control unit 6 from another master blind within the same set 4 or from the group and main control units 11–11", respectively 12.

In addition to the auxiliary switch unit 17 for decentralized operation of the blind 8, each control unit 6, 6' is provided with an internally positioned integrated up and down switches 26, 26' with which exclusively the associated blind 8 can be operated by the user and no master control of other blinds in the same set is possible.

Each control unit 6, 6' or sub master unit 10 comprises a further number of dip switches (generally 25) with which the address of the control unit can be set. Each address may be formed by setting for instance 4 dip switches such that a total of sixteen different combinations can be formed. In the subject embodiment two of the total of sixteen possible combinations are reserved for specific purposes, so that fourteen combinations are available for addressing and distinguishing control units from one another. The control units in the set 2, 3 or 4 having a specific address only react to control signals originating from a master blind within the same set having the same address, or to control signals originating from the group or main control units 11, 11', 11" or 12 associated with the particular set of the blind. The masters control unit 10 in each set 2, 3, 4 responds to control data from the respective group controller 11–11" which may be operated via a dial, for instance for adjusting the slat angle, via a databus or computer output connected to the input 16 or via a data input from the main control unit 12.

Figure 2:
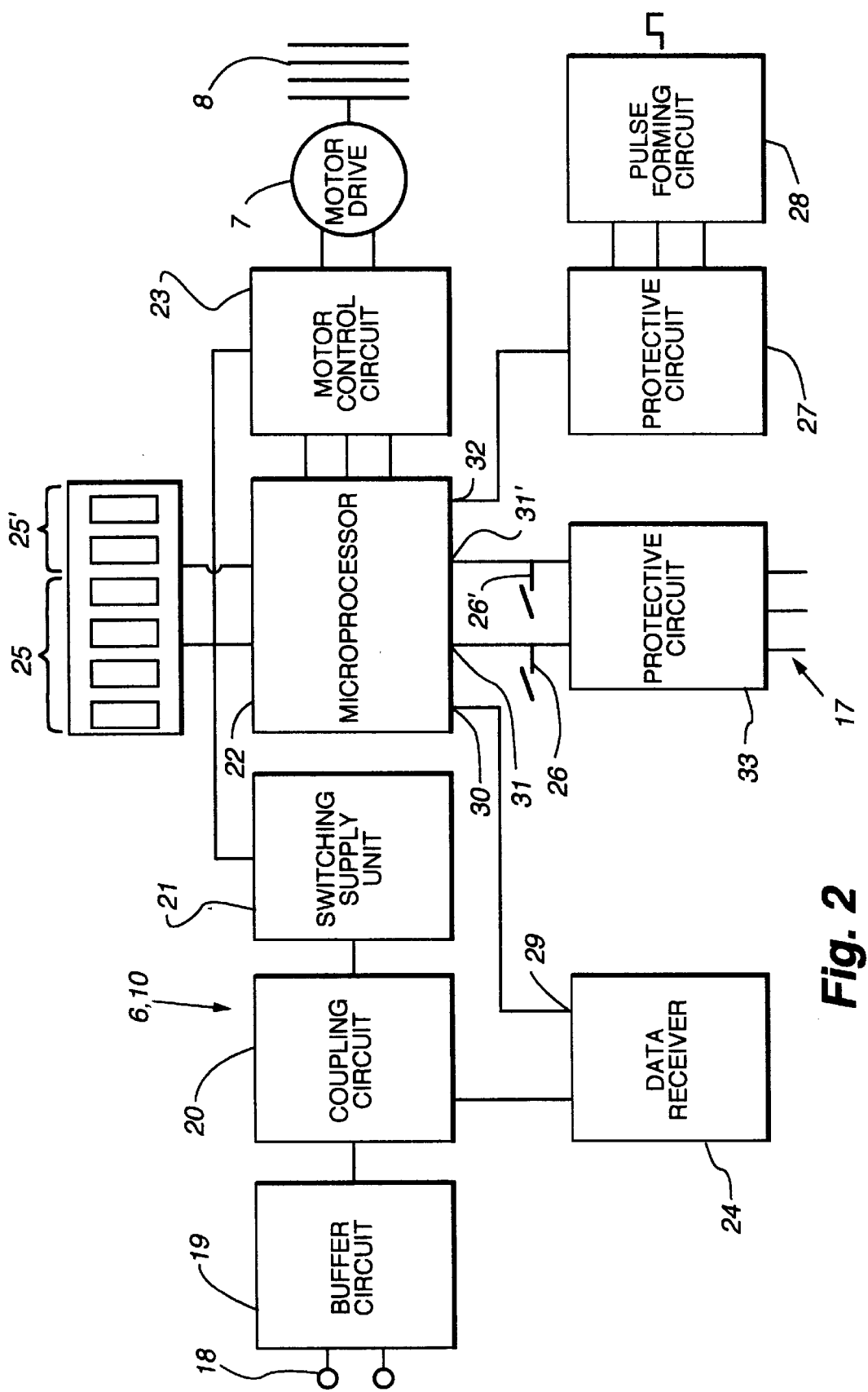

FIG. 2 schematically shows the lay-out of the control unit 6, or sub master unit 10 if identical, comprising a terminal 18 for connecting to the two-wire data communication and power transmission line 9, a protective, or buffer circuit 19, a coupling circuit 20, a switching supply unit 21, a microprocessor 22, a motor control circuit 23, a data receiver 24, a pulse forming circuit 28 and a protective circuit or buffer 27. Data pulses arriving at the terminal 18 are passed through an EMC filter and buffer circuit 19 to the coupling circuit 20 for filtering the data from the supply voltage. The 24 V DC supply voltage is fed to the switching supply unit 21 which powers the microprocessor 22 and the motor control circuit 23. The output of the filter of the coupling circuit 20 is connected to the Input of the data receiver 24, which comprises a phase locked loop (PLL) and detector. The data pulses which are recovered in the data receiver 24 are forwarded at the output 29 to the data input 30 of the microprocessor 22. On receiving the data signals as its data input 30, the microprocessor 22 drives the motor control circuit 23 for forwards or backwards rotation of the motor drive 7.

Via the auxiliary up and down switch unit 17, which may include an infrared remote control receiver, up and down pulses may be supplied by a user to the inputs 31, 31' of the microprocessor 22 via a further protective circuit 33 for actuating the motor drive 7. It is also possible to supply up and down pulses to the inputs 31, 31' by means of the integrated switches 26, 26' which are mounted on the PCB (printed circuit board) of the control unit 6 for exclusively operating the blind 8, no group control being possible via the integrated switches 26, 26'.

A dip switch unit 25, 25' is connected to the microprocessor 22 for setting the address of the control unit 6 by operating for instance four switches 25 and for setting the controller to the master mode or to the slave mode by operating one of two dip switches 25'. The other of the dip switches 25' can be used to select either time count or pulse count motor control. By setting the addresses of the control units to one of the possible combinations (maximal 16, of which 2 are preferably reserved), the specific groups that are controlled via the master mode control unit 10 may be selected. A signal coming from the group control unit via the two-wire line 9 will also cause the control units 6 or sub master control unit 10 associated therewith to actuate the motor drive 7, irrespective of the selected address or its master or slave mode.

The pulse forming circuit 28 comprises a filter connected to the motor drive 7 for filtering the motor current and for generating motor pulses when motor pulses are selected. Via the protective circuit 27, the motor pulses are supplied to a pulse input 32 of the microprocessor 22. After installation of the blinds in a building, the microprocessor 22 after an initial power set-up, or following each subsequent power interruption, executes an installation routine to calibrate or reset the blind positions. In this calibration or reset routine the slats of the blinds are tilted back and forth a number of times between their end positions. The microprocessor determines how many pulses from the pulse forming circuit 28 correspond with the maximum tilt angle of the slats. Thereafter the slats are placed in a reference position, for instance completely opened at a slat angle of 0 degrees such that all blinds in a set have the same position. At this stage a manual correction of the slat position of an individual blind can be made in a manner which will be described herein below. Manual correction can be provided for by executing a programmed algorithm, but also simply by means of a potentiometer. The microprocessor 22 comprises an algorithm for calculating how many motor or time pulses correspond to a certain angular position of the slats of the blind and vice versa, such that the angular position of each blind can be accurately determined by counting the motor or time pulses, and the motor can be stopped at a predetermined pulse count that corresponds with a particular angular position. The same applies to the up and down position of the blind or the horizontal position. When the motor is stopped, the current is reversed and the number of pulses of the reverse current are monitored. Also switching off the motor drive in the fully opened or fully closed positions of the blind is determined on the basis of the pulse count of the motor or time pulses. However as an additional safety measure there is preferably also provided an over-current protection which cuts out the motor drive in case a physical end position 13 reached before the stored count position is reached.

Because of inaccuracies during read-out of the pulses and to enable correction it is advantageous to regularly determine deviations in blind position by starting movement of the blinds from a predefined reference position. This can for instance be carried out by bringing the blinds into a closed position each time after for instance 20 adjustments of the blind position, so that the blind angle can be accurately determined and a correction to the pulse count in the microprocessor 22 can be made if necessary. Moving the blinds from a reference position can also be carried out each time an entire group is adjusted by a group or main control unit 11, 11', 11" or 12.

Figure 3:
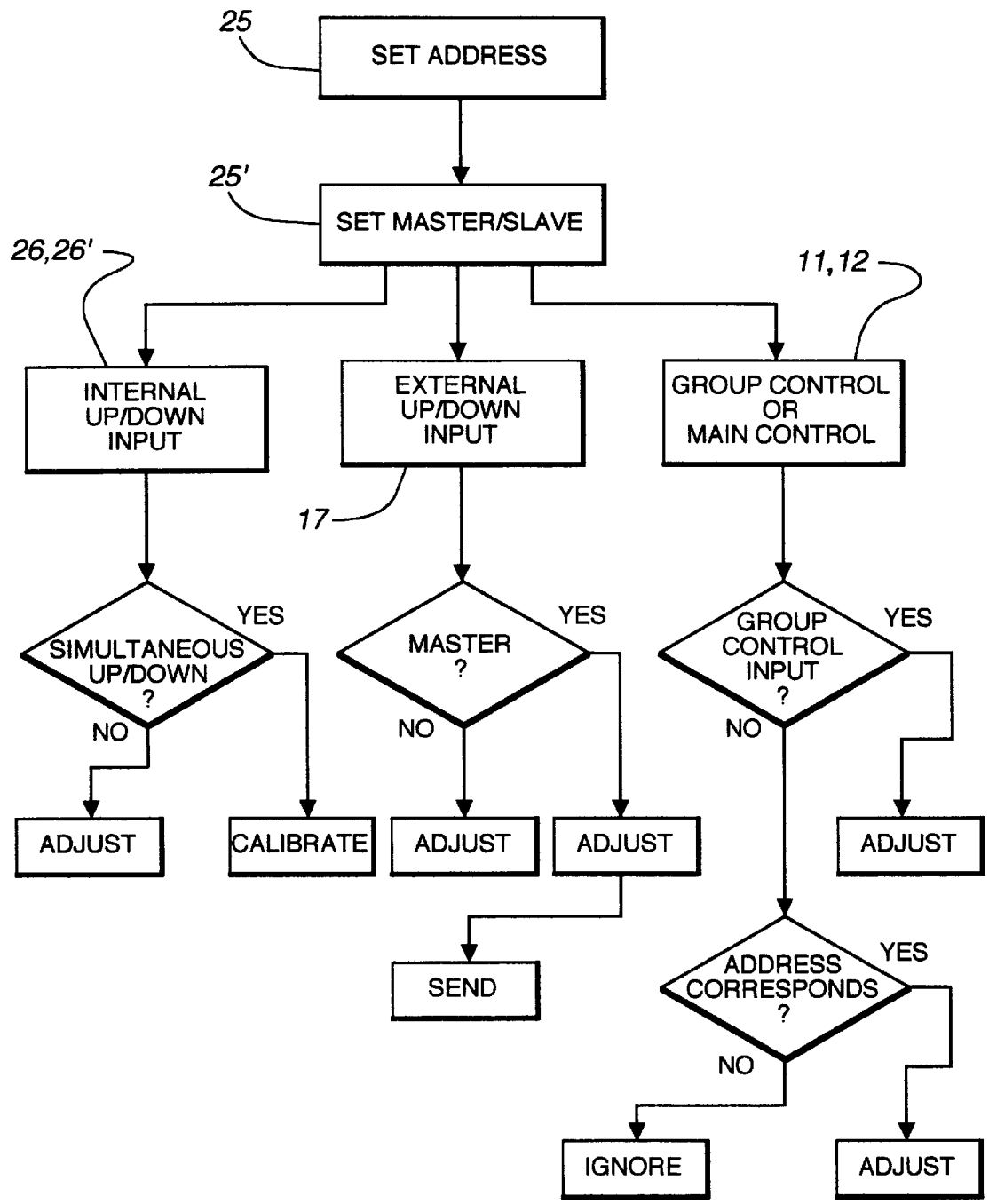

In FIG. 3 the operation of the slave control unit 6 and master control unit 10 of FIG. 2 is schematically indicated. With the first four dip switches 25 the address of the specific light regulating assembly 5 is set. Valid addresses are 14 combinations of the total of 16 combinations of which 2 have been reserved for other purposes. If an invalid address is set, the control unit 6 will not send out any positions or receive any positioning commands from another master control unit or from the group control unit. One of two dip switches 25' can be used to set the control unit into a master mods or into a slave mode, for instance the switch being in the OFF position determining the slave mode whereas the switch being in the ON position resulting in a master mode of control unit 6 (or 10). The other one of the two switches 25' can be used to set the motor control unit 23 to either motor pulse or time pulse control.

If a control signal is received in the control unit 6 (or 10) from one of the internal integrated up and down switches 26, 26', and if the integrated switches 26, 26' are not operated simultaneously, the control unit 6 (or 10) will execute the required blind adjustment of the individual blind associated therewith. A manual correction of the light regulating device (i.e., the slat position thereof) can be made if the integrated up and down switches 26, 26' are both operated simultaneously during 5 seconds, the control unit will execute the correction step wherein the blind 8 and the motor 7 are individually calibrated. After calibration, the control unit 6 (or 10) waits for the user to indicate a preferred position using up and down switches 26, 26'. After entering the preferred position, the individual calibration mode is terminated by again simultaneously operating both up and down switches 26, 26' for 5 seconds. Termination of the calibration stop is indicated by the control unit 6 (or 10) by moving the blind in its downwards or closed position. After releasing both the integrated switches 26, 26' by the user, the blind will move to its indicated preferred position. In the calibration or reset step, which is only executed after a power connection or reconnection, the total number of pulse counts of the motor in the upward (motor up count) and in the downward direction (motor down count) are determined. Also the time count for moving the motor from its up portion to its down position is determined. The average of the motor up count and motor down count is determined. At the lowest possible position of the motor which can be set, the 4% value of the average is taken, and 96% of the average is taken as the highest possible position of the motor which can be set.

If the difference between the motor up count and the motor down count during calibration is larger than 50, a correction algorithm is executed in which, upon driving of the motor, the motor count is altered by one count in the direction having the lower number of total counts and is altered by a specific count fraction in the direction having higher number of counts, for obtaining a smooth motor control in both the directions.

If the external auxiliary up and down switch unit 17 is used for blind adjustment, the control unit 6 (or 10) will determine if it is set into a master or a slave operational mode and act differently in accordance therewith. In the slave mode, only the associated individual blind 8 is adjusted according to the input of auxiliary switch unit 17. If the control unit 6 (or 10) is set in its master mode, the blind 8 will be adjusted and two seconds after the last operation of the auxiliary switch unit 17, the same blind position will be sent to all control units and blinds in the same group via terminal 18. Slave control units having the same address will then effect adjustment to the same position. If the auxiliary switch unit 17 is operated twice within two seconds, the first selected position will be ignored and only the last selected position will be sent out to connected control units via the terminal 18.

If the control unit receives on its terminal 18 a command signal, it is first determined whether the signal originates from the group or main control units 11–11" or 12. If this is so, the blinds are adjusted accordingly. If the signal on the terminal 18 is originating from a main control unit, it is checked by each master or slave control unit whether the data comprise the address of the specific control unit which is set by dip switches 25. If the address of the control signal corresponds with the address of the control unit, all the relevant blinds 8 are adjusted. If the address of the command signal does not correspond to the address set by dip switches 25, the command signal is ignored by the particular master or slave control unit.

The communication system of the blind arrangement according to the present invention uses a 300 baud half duplex communication. Because the communication along the data and power transmission lines 9, 9' is half duplex, no one of the connected control units may be in the send mode. In this way a transmission line is always quiet and each unit can "listen" for commands. If a control unit wants to transmit date it must wait until the transmission lines go quiet. For detecting whether the transmission lines are quiet, a control unit must check to see if commands are received. If this is not the case the control unit may go into its send mode and transmit the data. After data transmission the transmitter is switched off and the respective control unit will listen again for commands.

Sending of commands for instance from a master control unit 6, respectively 10, via terminal 18 is carried out as follows:
Switching on the transmitter.
Sending out a preamble byte to calibrate the receivers. The data used for the preamble byte are 0×AA.
Wait 5 ms after sending of the preamble byte. Because only a small part of the preamble byte is received by the receivers, a rest period must be used for the clock cycle of the receivers corresponding to a complete byte. The minimum time after sending a preamble byte corresponds to the time duration of one byte (34 MS) because the last bit of the preamble byte could be seen as the start bit by the receiver.
Sending out the command bytes.
Wait for about 15 ms after sending the last byte to get a clear idle condition on the transmission line.
Switching off the transmitter and switching on the receiver.
To prevent communication errors each command is sent out 3 times with intervals of 200 ms. The waiting time is needed for the group control units 11–11" to receive the commands and send these out again from their transmission outputs. The commands used in the blind control system according to the present invention are defined as follows:
A command header wherein the header byte always corresponds to 0×55.
The command length is the length of the command string including the length byte and the CRC (cyclical redundancy checking) byte. The command header is not included. The length of the command byte is always 4 plus the number of data bytes. The minimum value is 4 and the maximum value is 9.
The units ID or address of the control units 6, 6' that are to respond to the command.
Valid addresses are 1 to 14. Of the total of 16 combinations "addresses" 0 and 15 are not allowed as these will be reserved for specific functions.
The command code which has to be executed has 0 to 5 data bytes available for parameters. A valid code is 1, all other command codes being ignored. Command code 1 means to put the blind at a position indicated in data byte 1. Valid positions are 0 to 31.
The data bytes comprise the parameters for the command to be executed. In a command string a minimum of 0 and a maximum of 5 data bytes are comprised.
Cyclical redundancy checking or CRC. 8 bits CRC with a polynomial of 0×19 are calculated for the command string (from the command length to the last data byte) back to front.
Communication takes place at a speed of 300 baud, 8 bits no parity.

While reference is made in the above to 16 possible combinations for address identification it should be understood that any number in excess of this would not deviate from the invention.

To improve the quality of data transmission to control units and to prevent undesired data transfer to other groups a high frequency filter (HFF) can be incorporated at each power supply terminal for each group of light regulating assemblies.

In a simplified arrangement one master control unit can control several slave control units without the need for group or main control units. Each slave control unit as well as the master control unit thereby can be associated with an individual light regulating device, such as a blind.

In a more elaborate arrangement several main control units could be branched from a single main control unit and similarly several group control units could be branched from a single group control unit. The single group control unit thereby acts as a main control unit to the other group control units. In a preferred arrangement each main or group control unit can control up to 50 master and slave control units or up to 49 other main or group control units.

We claim:
1. A control system for light regulating devices wherein said system comprises:

a control unit with an output connected to a motor drive of a light regulating device, said control unit comprising a first input connected to a first data supply line for receiving motor control data for operating the motor drive of the light regulating device; and a second input for receiving decentralized user commands for altering the position of the light regulating device, whereby the control unit is set by a command input into either a slave mode in which data can only be received or into a master mode in which data can be received and transmitted along the first data supply line.

2. The control system of claim 1 wherein said data comprises:

address data, and the control unit has an address input for setting an address of the control unit by means of an external command.

3. The control system of claim 2 wherein said address input comprises at least one switch.

4. The control system of claim 3 wherein said switch comprises a manually operated switch.

5. The control system according to claim 1, wherein said first data supply line comprises an electrical conductor supplying both power and data to the control unit.

6. The control system according to claim 1, wherein said control system comprises at least two control units, each connected via the first data supply line to a group control unit, the group control unit providing at its output data to the first data supply line for operating the control units in response to a user command signal at an input of the group control unit.

7. The control system of claim 6 wherein the group control unit comprises a manually operable input for forming the user command signal.

8. The control system according to claim 6 wherein the group control unit comprises an input for receiving an electrical signal for forming the user command signal.

9. The control system according to claim 6 wherein the system comprises at least two group control units connected via a second data supply line to a main control unit, the main control unit providing at its output data on the second data supply line to the command input of the group control units, in response to a user command signal at the input of the main control unit.

10. The control system according to claim 9, wherein the main control unit comprises a manually operable input for forming the user command signal.

11. The control system according to claim 9, wherein the main control unit comprises an input for receiving an electrical signal for forming the user command signal.

12. The control system of claim 9, wherein the group control unit comprises a manually operable input for forming the user command signal.

13. The control system of claim 9, wherein the group control unit comprises an input for receiving an electrical signal for forming the user command signal.

14. The control system according to claim 1, wherein only control units in the slave mode having the same address as a control unit in the master mode are responsive to data at the output of a control unit in the master mode.

15. The control system according to claim 1, wherein the control unit comprises a pulse input for receiving pulses generated during rotation of the motor drive, the control unit determining for each light regulating device the number of pulses generated when moving the light regulating device between its fully open and fully closed positions.

16. The control system according to claim 15, wherein the control unit in an installation step places the drive motor in a predetermined drive motor reference position for allowing adjustment of the position of the light regulating devices at said drive motor reference position.

17. The control system according to claim 15, wherein the motor drive is deactivated by the control unit after the control unit has received a predetermined number of pulses.

18. The control system according to claim 15, wherein after a predetermined number of operations of the motor drive, the control unit moves the motor drive associated with said control unit to the fully opened or fully closed position of the light regulating device for recalibrating the position of the light regulating device, which position is represented by the number of pulses counted by the control unit for arriving at said fully opened or fully closed position.

19. The control system of claim 18, wherein the motor drive is deactivated by the control unit after the control unit has received a predetermined number of pulses.

20. The control signal of claim 15, wherein only control units in the slave mode having the same address as a control unit in the master mode are responsive to data at the output of a control unit in the master mode.

21. The control system of claim 5, 6, 14 or 15, wherein said data comprises address data, and the control unit has an address input for setting an address of the control unit by means of an external command.

22. The control system of claim 5, 6, 14 or 15, wherein said data comprises address data, and the control unit has an address input for setting an address of the control unit by means of an external command, and wherein said address input comprises at least one switch.

23. The control system of claim 5, 6, 14 or 15, wherein said data comprises address data, and the control unit has an address input for setting an address of the control unit by means of an external command, wherein said address input comprises at least one switch, and wherein said at least one switch comprises a manually operated switch.

24. The control system of claim 6, 8, 14 or 15, wherein said first data supply line comprises an electrical conductor supplying both power and data to the control unit.

25. The control system of claim 14 or 15, wherein said control system comprises at least two control units, each connected via the first data supply line to a group control unit, the group control unit providing at its output data to the first data supply line for operating the control units in response to a user command signal at an input of the group control unit, and wherein the group control unit comprises a manually operable input for forming the user command signal.

26. The control system of claim 14 or 15, wherein said control system comprises at least two control units, each connected via the first data supply line to a group control unit, the group control unit providing at its output data to the first data supply line for operating the control units in response to a user command signal at an input of the group control unit, and wherein the group control unit comprises an input for receiving an electrical signal for forming the user command signal.

27. The control system of claim 14 or 15, wherein said control system comprises at least two control units, each connected via the first data supply line to a group control unit, the group control unit providing at its output data to the first data supply line for operating the control units in response to a user command signal at an input of the group control unit.

28. The control system of claim 14 or 15, wherein said control system comprises at least two control units, each connected via the first data supply line to a group control unit, the group control unit providing at its output data to the first data supply line for operating the control units in response to a user control signal at an input of the group control unit, and wherein the system comprises at least two group control units connected via a second data supply line to a main control unit, the main control unit providing at its output data on the second data supply line to the command input of the group control units, in response to a user command signal at the input of the main control unit.

29. The control system of claim 14 or 15, wherein the system comprises at least two group control units connected via a second data supply line to a main control unit, the main control unit providing at its output data on the second data supply line to the command input of the group control units, in response to a user command signal at the input of the main control unit, and wherein the main control unit comprises a manually operable input for forming the user command signal.

30. The control system of claim 14 or 15, wherein the system comprises at least two group control units connected via a second data supply line to a main control unit, the main control unit providing at its output data on the second data supply line to the command input of the group control units, in response to a user command signal at the input of the main control unit, and wherein the main control unit comprises an input for receiving an electrical signal for forming the user command signal.

31. The control system of claim 17 or 18, wherein the control unit in an installation step places the drive motor in a predetermined drive motor reference position for allowing adjustment of the position of the light regulating devices at said drive motor reference position.

* * * * *